(12) United States Patent
Park

(10) Patent No.: US 7,542,724 B2
(45) Date of Patent: Jun. 2, 2009

(54) METHOD AND DEVICE OF CORRECTING RECEIVED LEVELS IN MOBILE COMMUNICATION TERMINAL

(75) Inventor: Yong Guk Park, Incheon metropolitan (KR)

(73) Assignee: Pantech Co., Ltd., Seoul (KR)

( * ) Notice: Subject to any disclaimer, the term of this patent is extended or adjusted under 35 U.S.C. 154(b) by 396 days.

(21) Appl. No.: 11/165,704

(22) Filed: Jun. 24, 2005

(65) Prior Publication Data

US 2006/0035592 A1 Feb. 16, 2006

(30) Foreign Application Priority Data

Aug. 13, 2004 (KR) .................... 10-2004-0063810

(51) Int. Cl.
*H04B 17/00* (2006.01)
*H03C 1/62* (2006.01)
(52) U.S. Cl. ............... 455/67.11; 455/67.13; 455/115.3
(58) Field of Classification Search ............. 455/67.11, 455/67.13, 115.3, 132, 134, 161.3, 434, 450, 455/464, 509, 510, 511, 515, 103, 151.1, 455/154.1, 166.1, 166.2, 179.1
See application file for complete search history.

(56) References Cited

FOREIGN PATENT DOCUMENTS

| KR | 1999-003248 | 1/1999 |
|---|---|---|
| KR | 2001-0113131 | 12/2001 |
| KR | 10-2003-0063230 | 7/2003 |

*Primary Examiner*—Eugene Yun
(74) *Attorney, Agent, or Firm*—H.C. Park & Associates, PLC

(57) ABSTRACT

A method and a device of correcting received levels in a mobile communication terminal are disclosed. According to the method of the invention, channels received at the mobile communication terminal are classified into a channel group on every predetermined number of the channels. And one main channel, at least one neighboring channel being adjacent to the main channel and at least one surrounding channel being adjacent to the neighboring channel are set on every channel group classified. A RSSI detector of the mobile communication terminal measures a received signal strength indicator (RSSI) value for the main channel only among the set channels. The measured value may be stored in a memory and used to correct received levels of the neighboring channel and the surrounding channel. Accordingly, it is possible to correct the channels of which RSSI are not measured with a value close to actual RSSI value.

5 Claims, 2 Drawing Sheets

METHOD AND DEVICE OF CORRECTING RECEIVED LEVELS IN MOBILE COMMUNICATION TERMINAL

CROSS-REFERENCE TO RELATED APPLICATION

The present application is claiming priority of Korean Patent Application No. 10-2004-0063810, filed on Aug. 13, 2004, the content of which is herein incorporated by reference.

BACKGROUND OF THE INVENTION

1. Field of the Invention

The present invention relates to a method and a device of correcting received levels in a mobile communication terminal, and more particularly, to a method and a device of correcting received levels in a mobile communication terminal capable of improving a reception efficiency and a communication quality of the mobile communication terminal by correcting received levels for each channel received at the mobile communication terminal.

2. Background of the Related Art

Generally, a mobile communication terminal comprises a radio frequency module. The radio frequency module performs a function of receiving radio signal from a base station and also measures an intensity of the radio signal received from the base station.

In this case, the intensity of the radio signal measured by the radio frequency module can be shown as a numerical value of a received signal strength indicator (RSSI) which is a received level. In general, the 'received signal strength indicator' is a mean strength index of received signal intensities, which can be obtained by measuring intensities of all radio signals received at a mobile communication terminal.

A 'correction' of the RSSI is obtained by measuring received levels of a reference channel and other channels, then storing difference values between the received levels measured and correcting received levels in actual network using the stored values, where a cell power of a broadcasting channel (BCH) transmitted from the base station is regulated to 62 dBm.

With regard to the correction of the RSSI, it is not easy to measure and store RSSI values for all channels received at the mobile communication terminal. Accordingly, a method is currently used that only one channel per a predetermined number of channels, for example ten (10) channels, is representatively selected as main channel(MC). In this case, only the selected main channel's RSSI value is measured and RSSI values of the other 9 channels are not measured. The measured RSSI value of the main channel can be applied as that of each channel of which RSSI value is not measured.

However, according to the above method, even if the RSSI value of the main channel is measured to be abnormally large(that is, the signal is very highly bounced) by a certain cause, the abnormal RSSI value is, as it is, applied to each channel of which RSSI values is not measured.

In order to decrease a risk that the above problem occurs, a method that measures RSSI values of two main channels and then applies a mean value of the measured RSSI values as that of channels between the two main channels can be used.

For example, there is a method that a mean value, which is obtained by adding a RSSI value measured in the channel '0' to a RSSI value measured in the channel '9' and then dividing the sum by two (2), is applied as RSSI values of channels whose absolute radio frequency channel numbers (ARFCNs) are '0' to '9.

However, even though the mean of the RSSI values of the two main channels is applied, there can still be occurred a bad result when compared to applying actual RSSI value.

Accordingly, there is needed a technique capable of applying a value close to a actual RSSI value to each channel of which RSSI value is not measured while measuring only a RSSI value of a main channel.

SUMMARY OF THE INVENTION

Accordingly, the present invention has been made to solve the above-mentioned problems occurring in the prior art. The object of the present invention is to provide a method and a device of correcting received levels so as to correct each channel of which RSSI value is not measured with RSSI values close to their actual RSSI values.

In order to accomplish the object, there is provided a method of correcting received levels in a mobile communication terminal, said method comprising classifying channels which may be received at the mobile communication terminal into a channel group on every predetermined number of the channels and setting one main channel, at least one neighboring channel being adjacent to the main channel and at least one surrounding channel being adjacent to the neighboring channel on every each channel group classified; measuring a received signal strength indicator (RSSI) value of the main channel; if the mobile communication terminal receives a neighboring channel, applying the RSSI value of main channel nearest to the neighboring channel as a RSSI value of the neighboring channel; and if the mobile communication terminal receives the surrounding channel, applying a mean value of RSSI values of a former main channel and a latter main channel of the surrounding channel as a RSSI value of the surrounding channel.

In accordance with another aspect of the invention, there is provided a device for correcting received levels in a mobile communication terminal comprising a memory for storing information about classifying channels which may be received at the mobile communication terminal into a channel group on every predetermined number of the channels and setting one main channel, at least one neighboring channel being adjacent to the main channel and at least one surrounding channel being adjacent to the neighboring channel on every each channel group classified; a receiver for receiving channels from a base station; a RSSI detector measuring the received signal strength indicator (RSSI) value if the received channel is the main channel; and a controller for applying the RSSI value to the neighboring channels and a mean value of RSSI values of two main channels to the surrounding channels which are between said two main channels.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description of the present invention, a detailed description of known functions and configurations incorporated herein will be omitted when it may make the subject matter of the present invention rather unclear.

Figure 1:
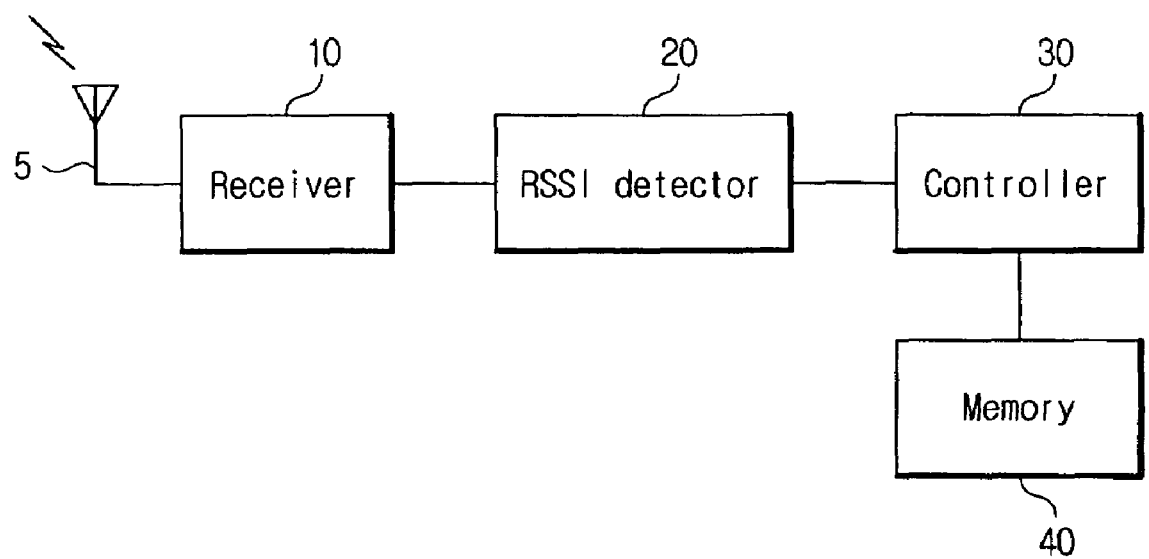
FIG. 1 is a block diagram showing a structure of a device for correcting received levels in a mobile communication terminal according to an embodiment of the invention.

As shown in FIG. 1, a device for correcting received levels in a mobile communication terminal according to an embodiment of the invention comprises a receiver 10, a RSSI detector 20, a controller 30 and a memory 40.

The channels that may be received at the mobile communication terminal are classified into a channel group on every predetermined number of the channels. Then the channels in each channel group are set one main channel, at least one neighboring channel being adjacent to the main channel and at least one surrounding channel being adjacent to the neighboring channel on every each channel group classified. In each of the channel groups, the main channel is a channel of which RSSI value is measured, the neighboring channel is at least one channel which immediately neighbors to the main channel and the surrounding channel is at least one channel which immediately neighbors to the neighboring channel. The memory 40 stores information about the classified and set channels.

The receiver 10 receives channels that is transmitted a base station, through an antenna 5.

The RSSI detector 20 detects a received signal strength indicator (RSSI) of the received channel if the received channel is the main channel. The memory 40 stores the detected RSSI value.

The controller 30 controls the RSSI detector 20 to measure only received levels of the preset main channel among the channels received from the base station and the measured value may be stored in the memory 40.

In the mean time, if a channel received from the base station is a neighboring channel, a received level of a main channel nearest to the neighboring channel is applied to the received neighboring channel. If a channel received from the base station is a surrounding channel, it is corrected with a mean value of measured RSSI values of a former main channel and a latter main channel of the received surrounding channel.

Like this, the controller 30 applies not only the RSSI value to the neighboring channels but a mean value of RSSI values of two main channels to the surrounding channels which is between said two main channels.

Hereinafter, the neighboring range, main channel, neighboring channel and surrounding channel will be explained with reference to Table 1.

Table 1 shows that channels are classified into one channel group on every 10 channels. As indicated in Table 1, a channel '2' and a channel '12' are set as a main channel of each channel group.

The neighboring channels (NC) of the main channel '2' are channels '0', '1', '3' and '4' and the neighboring channels (NC) of the main channel '12' are channels '10', '11', '13' and '14'. Accordingly, it can be seen that the neighboring range of the main channel is set to be ±2. When setting the neighboring channels like this, it can be set that the numbers of left and right neighboring channels of each main channel are to be equal.

The surrounding channels (SC) are remaining channels except the main channels (MC) and the neighboring channels (NC) among the channels classified into one channel group. In Table 1, the channels '5' to '9' are indicated as the surrounding channel (SC).

TABLE 1

| | Channel | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| Classification | NC | | MC | NC | | | | SC | | | NC | | MC | NC | |

As described above, Table 1 is an example that channels are classified into one channel group on every 10 channels. It can be seen from Table 1 that two neighboring channels (channels 0 and 1), one main channel (channel 2), two neighboring channels (channels 3 and 4) and five surrounding channels (channels 5 to 9) form a period and a new period starts from the channel 10. Like this, it can be set that arrangement orders of the channels are to be equal on every channel group.

Figure 2:
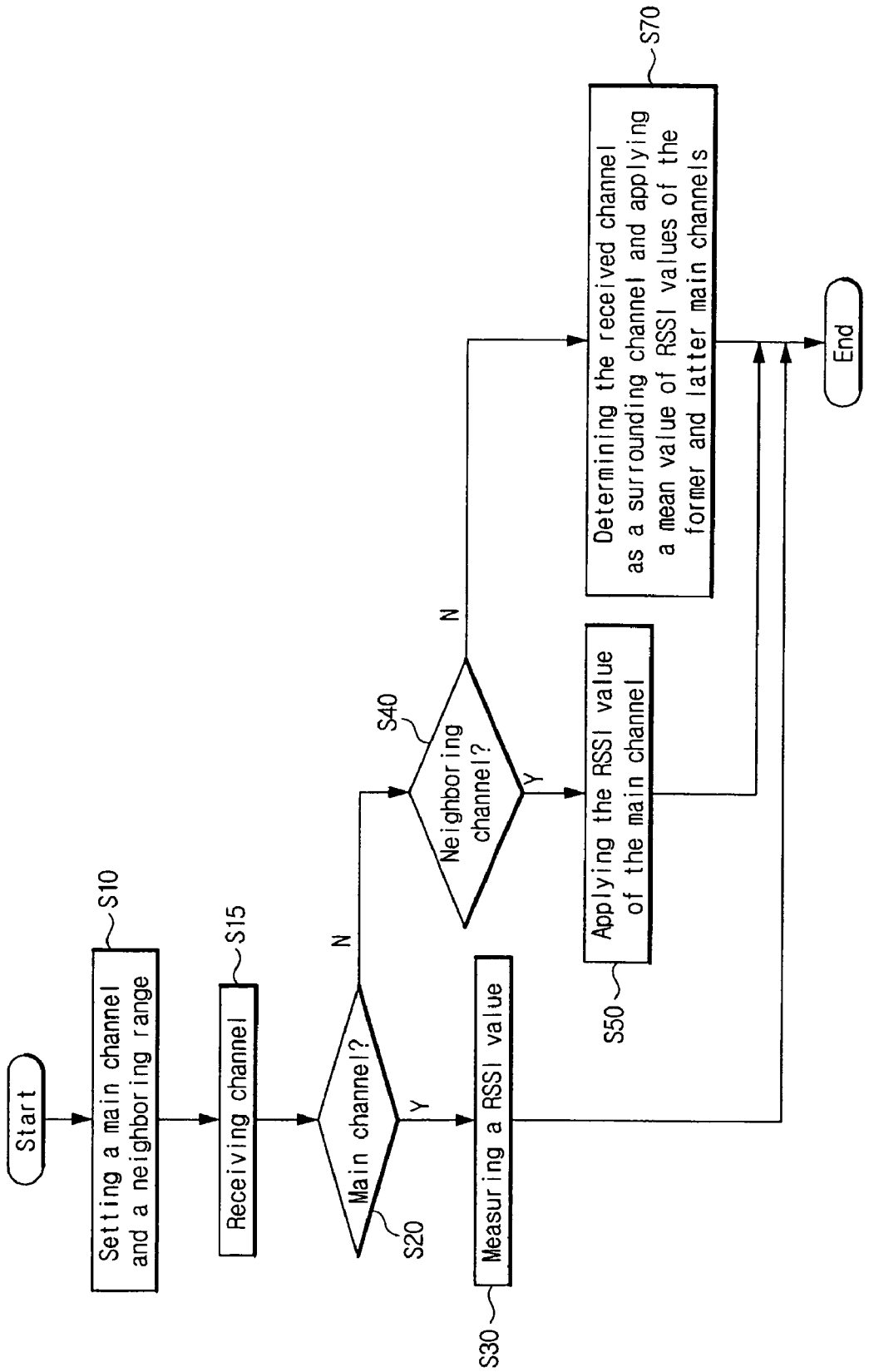
FIG. 2 is a flow chart showing a method of correcting received levels in a mobile communication terminal according to an embodiment of the invention.

FIG. 2 is a flow chart showing a method of correcting received levels of a mobile communication terminal according to an embodiment of the invention. Hereinafter, the method of correcting received levels according to an embodiment of the invention will be described with reference to FIG. 2.

Firstly, the channels received from the base station are classified into one channel group on every predetermined number of the channels, and one main channel, at least one neighboring channel adjacent to the main channel and at least one surrounding channel adjacent to the neighboring channels are set on every classified channel group (S10).

Like this, if the mobile communication terminal receives a channel under state that the main channel, the neighboring channel and the surrounding channel are set on every classified channel group, it is distinguished whether the received channel is the main channel, with reference to the channel setting information pre-stored in the internal memory (FIG. 1) of the mobile communication terminal (S20). If the received channel is the main channel, its RSSI value is measured (S30).

If the channel received at the mobile communication terminal is not the main channel, it is distinguished whether the receive channel is the neighboring channel, with reference to the channel setting information pre-stored in the internal memory of the mobile communication terminal (S40). If the received channel is the neighboring channel, the main channel nearest to the neighboring channel, is retrieved, so that the RSSI value of the retrieved main channel is applied as a RSSI value of the neighboring channel (S50).

If the channel received at the receiver 10 does not belong to both the main channel and the neighboring channel, it is determined to be the surrounding channel. In this case, a former main channel and a latter main channel of the surrounding channel are retrieved, with reference to the channel setting information pre-stored in the internal memory of the mobile communication terminal, and a mean value of the RSSI values of the two retrieved main channels is applied as a RSSI value of the surrounding channel (S70).

Hereinafter, the method of correcting the received levels according to the invention will be more specifically described with reference to Table 1.

In the embodiment of Table 1, a channel whose RSSI is measured is the main channel (MC) 2, among the channels 0 to 9. The RSSI value of the main channel (MC) 2 is applied to the main channel (MC) itself and the channels '0', '1', '3' and '4' which are neighboring channels of the main channel (MC) '2'.

In addition, the RSSI of the other main channel (MC) '12' is also measured, and the measured value is applied to the main channel (MC) '12' itself and the channels '10', '11', '13' and '14' which are neighboring channels (NC) of the main channel (MC) '12'.

In the mean time, a mean value of the RSSI values of the former main channel '2' and the latter main channel '12' is applied as the RSSI of the channels '5' to '9' corresponding to the surrounding channel (SC).

As described above, according to the invention, the channels received at the mobile communication terminal are classified into the main channel, the neighboring channel and the surrounding channel. And the RSSI values of the main channel and a mean value thereof are applied to the neighboring channel and the surrounding channel, respectively. Accordingly, it is possible to correct the received levels more efficiently, thereby improving the communication quality of the mobile communication terminal.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of correcting received levels in a mobile communication terminal, comprising:
    classifying channels received at the mobile communication terminal into a first channel group comprising a predetermined number of the channels;
    setting the channels of the first channel group to include a first main channel, at least one neighboring channel being adjacent to the first main channel, and at least one surrounding channel being adjacent to the neighboring channel;
    measuring a first received signal strength indicator (RSSI) value of the first main channel;
    if the mobile communication terminal receives a first neighboring channel, applying the first RSSI value as a RSSI value of the first neighboring channel; and
    if the mobile communication terminal receives a first surrounding channel, applying a mean value of the first RSSI value and a second RSSI of a second main channel in a second channel group as a RSSI value of the first surrounding channel, the first surrounding channel arranged between the first main channel and the second main channel.

2. The method according to claim 1, further comprising setting a number of neighboring channels on a first side of the first main channel to be equal to a number of neighboring channels on a second side of the first main channel.

3. The method according to claim 1, wherein an arrangement order of channels in the first channel group is equal to an arrangement order of channels in the second channel group.

4. A device for correcting received levels in a mobile communication terminal, comprising:
    a memory to store information about classifying channels received at the mobile communication terminal into a first channel group and about setting the channels of the first channel group to include a first main channel, at least one neighboring channel being adjacent to the first main channel, and at least one surrounding channel being adjacent to the neighboring channel;
    a receiver to receive the channels from a base station;
    a RSSI detector to measure a first received signal strength indicator (RSSI) value of the first main channel; and
    a controller to apply the first RSSI value of the first main channel as a RSSI value of a first neighboring channel and to apply a mean value of the first RSSI value and a second RSSI value of a second main channel in a second channel group as a RSSI value of a first surrounding channel.

5. The device according to claim 4, wherein the memory further stores the first RSSI and the second RSSI.

* * * * *